(12) United States Patent
Cheng

(10) Patent No.: US 7,823,040 B2
(45) Date of Patent: *Oct. 26, 2010

(54) METHOD AND APPARATUS FOR OPTIMAL REDUNDANCY VERSION (RV) SELECTION FOR UMTS HSDPA TRANSMISSIONS

(75) Inventor: Jung-Fu Cheng, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1050 days.

This patent is subject to a terminal disclaimer.

(21) Appl. No.: 11/548,543

(22) Filed: Oct. 11, 2006

(65) Prior Publication Data

US 2008/0090517 A1   Apr. 17, 2008

(51) Int. Cl.
  *H03M 13/00* (2006.01)
  *H04L 1/18* (2006.01)
(52) U.S. Cl. ..................... 714/751; 714/748
(58) Field of Classification Search ............ 714/748, 714/749, 751, 852, 774
  See application file for complete search history.

(56) References Cited

U.S. PATENT DOCUMENTS 7,237,170 B2 * 6/2007 Ratasuk et al. ............ 714/748

(Continued)

FOREIGN PATENT DOCUMENTS

EP    1641170 A2    3/2006

(Continued)

OTHER PUBLICATIONS

Cheng, Jung-Fu, "Coding performance of hybrid ARQ schemes," IEEE Transactions on Communications. Jun. 2006.

(Continued)

*Primary Examiner*—Sam Rizk

(57) ABSTRACT

A method and apparatus for identifying optimal redundancy version (RV) sequences for HSDPA transmissions based on extensive search. In a first embodiment of the present invention, in HSDPA QPSK mode, the transmitter retransmits according to the RV sequence [0 7 3 4 1 6 5 2] and in HSDPA 16QAM mode, the transmitter retransmits according to the RV sequence [0 1 3 4 5 6 7 1]. In a second embodiment of the present invention, in HSDPA QPSK mode, the transmitter retransmits according to the RV sequence [0 7 3 4 1 6 5 2] if the initial coding rate is greater than or equal to 0.5 and [0 4 3 6 2 1 6 2] if the initial coding rate is less than 0.5. In HSDPA 16QAM mode, the transmitter retransmits according to the RV sequence [0 1 3 4 5 6 7 1] if the initial coding rate is greater than or equal to 0.5 and the transmitter retransmits according to the RV sequence [0 4 5 6 0 4 5 6] if the initial coding rate is less than 0.5. In a third embodiment of the present invention, the transmitter retransmits according to the RV sequence according to each specific initial coding rate. In a fourth embodiment of the present invention, the transmitter retransmits according to the RV sequence according to a specific initial coding rate and a specific mother code rate. An SNR tracking algorithm is provided in conjunction with the optimal sequences for robust HARQ operations.

10 Claims, 18 Drawing Sheets

U.S. PATENT DOCUMENTS

| | | |
|---|---|---|
| 2003/0076783 A1* | 4/2003 | Das et al. .................... 370/236 |
| 2003/0133497 A1 | 7/2003 | Kinjo et al. |
| 2003/0135811 A1* | 7/2003 | Xu et al. ..................... 714/790 |
| 2005/0022097 A1 | 1/2005 | Cheng |
| 2006/0075319 A1 | 4/2006 | Ratasuk et al. |
| 2006/0150051 A1* | 7/2006 | Kwon et al. ................ 714/749 |

FOREIGN PATENT DOCUMENTS

EP   1655879 A1   5/2006

OTHER PUBLICATIONS

3GPP TS 25.212 V6.6.0 (Sep. 2005); $3^{rd}$ Generation Partnership Project; Technical Specification Group Radio Access Network; Multiplexing and channel coding (FDD) (Release 6).

Cheng, Jung-Fu, "Coding Performance of Hybrid ARQ with Bit Interleaved Coded Modulation," Proceedings of IEEE International Symposium of Information Theory, Jun. 2004.

Cheng, Jung-Fu, "On the Coding Gain of Incremental Redundancy over Chase Combining," Proceeding of IEEE Global Telecommunications Conference, Dec. 2003.

* cited by examiner

Fig. 1

| $X_{fv}$ (value) | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

| $X_{fv}$ (value) | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

| Initial Code Rate $r_1$ | Optimal RV Sequence |
|---|---|
| 0.99 | 0 7 3 6 5 1 2 5 |
| 0.98 | 0 7 3 4 5 1 2 3 |
| 0.97 | 0 7 3 4 5 1 2 3 |
| 0.96 | 0 7 3 4 5 1 2 3 |
| 0.95 | 0 7 3 4 1 5 2 1 |
| 0.94 | 0 7 3 4 1 5 2 1 |
| 0.93 | 0 7 3 4 1 5 2 1 |
| 0.92 | 0 7 3 4 1 5 2 1 |
| 0.91 | 0 7 3 4 1 5 2 1 |
| 0.90 | 0 7 3 4 1 5 2 1 |
| 0.89 | 0 7 3 4 1 5 2 1 |
| 0.88 | 0 7 3 4 1 5 2 1 |
| 0.87 | 0 7 3 4 1 5 2 1 |
| 0.86 | 0 7 3 4 1 5 2 1 |
| 0.85 | 0 7 3 4 1 5 2 1 |
| 0.84 | 0 7 3 4 1 5 2 1 |
| 0.83 | 0 7 3 4 1 5 2 1 |
| 0.82 | 0 7 3 4 1 5 2 1 |
| 0.81 | 0 7 3 4 1 5 2 1 |
| 0.80 | 0 7 3 4 1 5 2 1 |
| 0.79 | 0 7 3 4 1 5 2 1 |
| 0.78 | 0 7 3 4 5 6 1 2 |
| 0.77 | 0 7 3 4 5 6 1 2 |
| 0.76 | 0 7 3 4 5 6 1 2 |
| 0.75 | 0 7 3 4 1 6 5 2 |
| 0.74 | 0 7 3 4 1 6 5 2 |
| 0.73 | 0 7 3 4 1 6 5 2 |
| 0.72 | 0 7 3 4 1 6 5 2 |
| 0.71 | 0 7 3 4 6 5 1 2 |
| 0.70 | 0 7 3 4 6 1 5 2 |
| 0.69 | 0 7 3 4 6 5 2 1 |
| 0.68 | 0 7 3 4 6 5 2 1 |
| 0.67 | 0 7 4 3 6 5 2 1 |
| 0.66 | 0 7 4 3 6 5 2 1 |
| 0.65 | 0 7 4 3 6 5 2 1 |
| 0.64 | 0 3 4 7 6 5 2 1 |
| 0.63 | 0 3 4 7 6 5 2 1 |
| 0.62 | 0 7 4 3 6 2 5 1 |
| 0.61 | 0 7 4 3 6 2 5 1 |
| 0.60 | 0 7 4 3 6 2 5 1 |
| 0.59 | 0 7 4 3 6 2 5 1 |
| 0.58 | 0 7 4 3 6 2 5 1 |
| 0.57 | 0 7 4 3 6 2 5 1 |
| 0.56 | 0 7 4 3 6 2 5 1 |
| 0.55 | 0 7 4 3 6 2 5 1 |
| 0.54 | 0 7 4 6 3 2 4 1 |
| 0.53 | 0 7 4 6 3 2 4 1 |
| 0.52 | 0 4 7 6 2 3 4 0 |
| 0.51 | 0 4 7 6 2 3 4 0 |
| 0.50 | 0 4 1 6 2 1 2 6 |
| 0.49 | 0 4 3 6 2 1 4 0 |
| 0.48 | 0 4 3 6 2 1 6 2 |
| 0.47 | 0 4 3 6 2 1 4 0 |
| 0.46 | 0 4 3 6 2 1 6 2 |
| 0.45 | 0 4 3 6 2 1 2 6 |
| 0.44 | 0 4 5 6 2 1 0 4 |
| 0.43 | 0 4 5 6 2 1 4 0 |
| 0.42 | 0 4 5 6 2 1 0 4 |
| 0.41 | 0 4 6 2 5 1 6 2 |
| 0.40 | 0 6 4 2 1 5 2 4 |
| 0.39 | 0 6 4 2 1 5 0 2 |
| 0.38 | 0 6 4 2 1 5 0 2 |
| 0.37 | 0 6 4 2 1 5 0 2 |
| 0.36 | 0 6 4 2 3 1 5 0 |
| 0.35 | 0 6 4 2 3 1 0 2 |
| 0.34 | 0 6 4 2 3 1 0 2 |
| 0.33 | 0 7 1 2 3 4 6 5 |
| 0.32 | 0 7 1 2 3 4 6 5 |
| 0.31 | 0 7 1 2 3 4 6 5 |
| 0.30 | 0 7 1 2 3 4 6 5 |
| 0.29 | 0 7 5 2 6 1 3 4 |
| 0.28 | 0 6 4 2 7 3 1 5 |
| 0.27 | 0 6 4 2 7 3 5 1 |

Fig. 5a

| | | |
|---|---|---|
| 0.26 | 0 7 2 6 5 1 4 3 | |
| 0.25 | 0 7 2 6 5 3 4 1 | |
| 0.24 | 0 5 6 4 3 1 7 2 | |
| 0.23 | 0 4 7 3 5 1 6 2 | |
| 0.22 | 0 4 5 1 7 3 6 2 | |
| 0.21 | 0 4 5 1 7 3 6 2 | |
| 0.20 | 0 7 2 6 5 3 1 4 | |
| 0.19 | 0 6 4 2 5 1 3 7 | |
| 0.18 | 0 7 2 4 6 3 1 5 | |
| 0.17 | 0 7 1 2 3 4 6 5 | |
| 0.16 | 0 7 1 2 3 4 6 5 | |
| 0.15 | 0 7 5 2 6 1 3 4 | |
| 0.14 | 0 7 5 3 6 2 4 1 | |
| 0.13 | 0 4 5 1 7 3 6 2 | |
| 0.12 | 0 7 5 2 6 1 3 4 | |
| 0.11 | 0 7 1 2 3 4 6 5 | |
| 0.10 | 0 6 5 3 7 2 1 4 | |
| 0.09 | 0 6 5 3 7 2 1 4 | |
| 0.08 | 0 7 5 2 6 3 1 4 | |
| 0.07 | 0 7 5 2 6 1 3 4 | |
| 0.06 | 0 7 5 1 4 3 6 2 | |
| 0.05 | 0 6 5 3 7 2 1 4 | |
| 0.04 | 0 6 5 3 7 2 1 4 | |
| 0.03 | 0 7 1 2 3 4 6 5 | |
| 0.02 | 0 6 5 3 7 2 1 4 | |
| 0.01 | 0 6 5 3 7 2 1 4 | |

| Initial Code Rate $r_I$ | Optimal RV for $r_0=0.40$ | Optimal RV for $r_0=0.45$ | Optimal RV for $r_0=0.50$ |
|---|---|---|---|
| 0.99 | 07365125 | 07521634 | 07412563 |
| 0.98 | 07365125 | 07361452 | 07412563 |
| 0.97 | 07365125 | 05367412 | 07412563 |
| 0.96 | 07365125 | 05721634 | 07412563 |
| 0.95 | 07345162 | 07361254 | 07412563 |
| 0.94 | 07345612 | 07341652 | 07412563 |
| 0.93 | 07345612 | 07341652 | 07412563 |
| 0.92 | 07345612 | 07521634 | 07412563 |
| 0.91 | 07345612 | 07125643 | 07412563 |
| 0.90 | 07345612 | 01276345 | 07412563 |
| 0.89 | 07345612 | 05364721 | 07412563 |
| 0.88 | 05367412 | 05634721 | 07412563 |
| 0.87 | 05367412 | 07634521 | 07412563 |
| 0.86 | 05367412 | 07652341 | 07412563 |
| 0.85 | 05367412 | 07632541 | 07412563 |
| 0.84 | 05367412 | 05632741 | 07412563 |
| 0.83 | 05367412 | 03614725 | 07412563 |
| 0.82 | 05367412 | 07632541 | 07412563 |
| 0.81 | 05367241 | 07412563 | 07412563 |
| 0.80 | 01726345 | 07412563 | 07634521 |
| 0.79 | 05634721 | 07412563 | 07436521 |
| 0.78 | 05634721 | 05234610 | 07436521 |
| 0.77 | 05634721 | 05234610 | 07432561 |
| 0.76 | 05634721 | 05436210 | 07432561 |
| 0.75 | 07436521 | 05432610 | 07432561 |
| 0.74 | 07256341 | 05436214 | 07432561 |
| 0.73 | 07254630 | 05436214 | 07436521 |
| 0.72 | 05672412 | 05436214 | 07432561 |
| 0.71 | 07456230 | 05436214 | 07432561 |
| 0.70 | 03456216 | 05436214 | 07436251 |
| 0.69 | 07436214 | 07452631 | 07436251 |
| 0.68 | 07452630 | 07456231 | 07436251 |

Fig. 6a

| | | | |
|---|---|---|---|
| 0.29 | 07521436 | 04517362 | 04627153 |
| 0.28 | 04735621 | 04517362 | 06423175 |
| 0.27 | 04735162 | 07265314 | 07246315 |
| 0.26 | 04736251 | 06425173 | 07123465 |
| 0.25 | 04517362 | 07241635 | 07123465 |
| 0.24 | 07265314 | 07246315 | 07123465 |
| 0.23 | 06427315 | 07123465 | 07526134 |
| 0.22 | 07526341 | 07123465 | 07526134 |
| 0.21 | 07123465 | 07526341 | 05643172 |
| 0.20 | 07123465 | 06537214 | 04517362 |
| 0.19 | 07123465 | 07265314 | 07265341 |
| 0.18 | 07526134 | 04517362 | 07526134 |
| 0.17 | 07526134 | 07265314 | 07123465 |
| 0.16 | 04517362 | 07526341 | 07526341 |
| 0.15 | 07265314 | 07123465 | 06537241 |
| 0.14 | 07526341 | 07526314 | 07514362 |
| 0.13 | 07123465 | 05417362 | 07526134 |
| 0.12 | 06537214 | 07526143 | 07526341 |
| 0.11 | 07526143 | 07123465 | 04157362 |
| 0.10 | 07123465 | 04157362 | 07123465 |
| 0.09 | 07514362 | 07123465 | 07514362 |
| 0.08 | 07123465 | 06537214 | 06537214 |
| 0.07 | 06537214 | 07514362 | 07526314 |
| 0.06 | 06537214 | 04157362 | 06537241 |
| 0.05 | 07123465 | 07123465 | 07123465 |
| 0.04 | 07123465 | 06527143 | 07536241 |
| 0.03 | 06537214 | 07123465 | 06537241 |
| 0.02 | 07123465 | 07536241 | 07123465 |
| 0.01 | 07123465 | 07123465 | 07123465 |

Fig. 6c

| Initial Code Rate $r_1$ | Optimal RV for $r_0=0.55$ | Optimal RV for $r_0=0.60$ | Optimal RV for $r_0=0.65$ |
|---|---|---|---|
| 0.99 | 07523416 | 05147327 | 05147327 |
| 0.98 | 07523416 | 05147327 | 05147327 |
| 0.97 | 07523416 | 05147327 | 05147327 |
| 0.96 | 07523416 | 05147327 | 05147327 |
| 0.95 | 07523416 | 05147327 | 05147327 |
| 0.94 | 07523416 | 05147327 | 05147327 |
| 0.93 | 05167432 | 05147327 | 05147327 |
| 0.92 | 05167432 | 05147327 | 05147327 |
| 0.91 | 05167432 | 05147327 | 05147327 |
| 0.90 | 05167432 | 05147327 | 05147327 |
| 0.89 | 05167432 | 05147327 | 05147327 |
| 0.88 | 05167432 | 05147327 | 05147327 |
| 0.87 | 05167432 | 05147327 | 05167342 |
| 0.86 | 05167432 | 05147327 | 07345162 |
| 0.85 | 05167432 | 05147327 | 07345162 |
| 0.84 | 05167432 | 07345162 | 07345162 |
| 0.83 | 05164732 | 07345162 | 07345162 |
| 0.82 | 05164732 | 07345162 | 07345162 |
| 0.81 | 07342516 | 07345162 | 07345162 |
| 0.80 | 07342516 | 07345162 | 07345162 |
| 0.79 | 05147632 | 07345162 | 04735162 |
| 0.78 | 05147632 | 07345162 | 04753126 |
| 0.77 | 05147632 | 07345162 | 04753126 |
| 0.76 | 05147632 | 07435126 | 04753126 |
| 0.75 | 05147632 | 04735621 | 04753162 |
| 0.74 | 07342516 | 04735162 | 04753126 |
| 0.73 | 07342516 | 04735162 | 04753126 |
| 0.72 | 05416723 | 04735162 | 04756231 |
| 0.71 | 04736251 | 04751362 | 06423157 |
| 0.70 | 04736251 | 04751362 | 06423157 |
| 0.69 | 04736251 | 04753126 | 06423157 |
| 0.68 | 04517263 | 04753621 | 06423157 |
| 0.67 | 04517263 | 04625317 | 06423157 |
| 0.66 | 04517263 | 06423157 | 06423157 |

Fig. 7a

| | | | ← 700 |
|---|---|---|---|
| 0.65 | 04517263 | 06423157 | 07123465 |
| 0.64 | 04517263 | 06423157 | 07123465 |
| 0.63 | 04762153 | 06423157 | 07123465 |
| 0.62 | 06423157 | 06423157 | 07123465 |
| 0.61 | 06423157 | 06423157 | 07123465 |
| 0.60 | 06423157 | 07123465 | 07123465 |
| 0.59 | 06423157 | 07123465 | 07123465 |
| 0.58 | 06423157 | 07123465 | 07123465 |
| 0.57 | 06423157 | 07123465 | 07526134 |
| 0.56 | 06423157 | 07123465 | 06425137 |
| 0.55 | 07123465 | 07123465 | 06425137 |
| 0.54 | 07123465 | 07123465 | 06427315 |
| 0.53 | 07123465 | 07526341 | 06425137 |
| 0.52 | 07123465 | 07526134 | 06427351 |
| 0.51 | 07123465 | 06427315 | 07265143 |
| 0.50 | 07123465 | 06425137 | 07265143 |
| 0.49 | 07123465 | 06427351 | 07265314 |
| 0.48 | 07526314 | 06427153 | 07265314 |
| 0.47 | 06427315 | 07265143 | 05643172 |
| 0.46 | 06425371 | 07265314 | 04635712 |
| 0.45 | 06425137 | 07265314 | 04517362 |
| 0.44 | 06427351 | 07265314 | 04732651 |
| 0.43 | 07265314 | 04635721 | 04517362 |
| 0.42 | 07265143 | 04735621 | 04517362 |
| 0.41 | 07562143 | 04517362 | 04517326 |
| 0.40 | 07536241 | 04517362 | 07536241 |
| 0.39 | 04635721 | 04517362 | 07265314 |
| 0.38 | 04732651 | 04517362 | 04627315 |
| 0.37 | 04517362 | 05643172 | 06425137 |
| 0.36 | 04517362 | 07265314 | 06425137 |
| 0.35 | 04735621 | 04627153 | 07526341 |
| 0.34 | 05643172 | 06423175 | 07123465 |
| 0.33 | 07265314 | 07526341 | 07123465 |
| 0.32 | 04627153 | 07526314 | 07123465 |
| 0.31 | 06427315 | 07123465 | 07123465 |
| 0.30 | 07526341 | 07123465 | 07526314 |
| 0.29 | 07123465 | 07123465 | 07526134 |
| 0.28 | 07123465 | 07526341 | 07526134 |

Fig. 7b

| | | | ← 700 |
|---|---|---|---|
| 0.27 | 07123465 | 07526134 | 05643172 |
| 0.26 | 07123465 | 07526134 | 04517362 |
| 0.25 | 07526134 | 05417362 | 07514362 |
| 0.24 | 07526134 | 04517362 | 06527143 |
| 0.23 | 07536241 | 04157362 | 07526314 |
| 0.22 | 04517362 | 06527143 | 07123465 |
| 0.21 | 07536214 | 07526341 | 07123465 |
| 0.20 | 07526314 | 07123465 | 06537214 |
| 0.19 | 07123465 | 07246315 | 07536214 |
| 0.18 | 07123465 | 06537214 | 04157362 |
| 0.17 | 07241635 | 04517362 | 07526341 |
| 0.16 | 07536241 | 07526314 | 07123465 |
| 0.15 | 06537214 | 07123465 | 06537214 |
| 0.14 | 07123465 | 06537214 | 06537214 |
| 0.13 | 07526134 | 07536241 | 07123465 |
| 0.12 | 04157362 | 07123465 | 07536241 |
| 0.11 | 07123465 | 07536241 | 07123465 |
| 0.10 | 04157362 | 07123465 | 07341562 |
| 0.09 | 07123465 | 06537214 | 07526134 |
| 0.08 | 07421365 | 04157362 | 07246351 |
| 0.07 | 07526341 | 04157362 | 06537214 |
| 0.06 | 07526314 | 07123465 | 07246315 |
| 0.05 | 07123465 | 07123465 | 07123465 |
| 0.04 | 07526314 | 07123465 | 06527143 |
| 0.03 | 06537241 | 07123465 | 06537214 |
| 0.02 | 04157362 | 07123465 | 04157362 |
| 0.01 | 07123465 | 07123465 | 07123465 |

Fig. 7c

| Initial Code Rate $r_1$ | Optimal RV for $r_0$=0.70 | Optimal RV for $r_0$=0.75 | Optimal RV for $r_0$=0.80 |
|---|---|---|---|
| 0.99 | 0 7 3 5 1 2 4 7 | 0 7 3 5 1 2 7 3 | 0 7 5 3 1 2 1 3 |
| 0.98 | 0 7 3 5 1 2 4 7 | 0 7 3 5 1 2 7 3 | 0 7 5 3 1 2 1 3 |
| 0.97 | 0 7 3 5 1 2 4 7 | 0 7 3 5 1 2 7 3 | 0 7 5 3 1 2 1 3 |
| 0.96 | 0 7 3 5 1 2 4 7 | 0 7 3 5 1 2 7 3 | 0 7 5 3 1 2 1 3 |
| 0.95 | 0 7 3 5 1 2 4 7 | 0 7 3 5 1 2 7 3 | 0 7 5 3 1 2 1 3 |
| 0.94 | 0 7 3 5 1 2 4 7 | 0 7 3 5 1 2 7 3 | 0 7 5 3 1 4 1 3 |
| 0.93 | 0 7 3 5 1 2 4 7 | 0 7 3 5 1 2 7 3 | 0 7 5 3 1 4 1 3 |
| 0.92 | 0 7 3 5 1 2 4 7 | 0 7 5 3 1 4 1 3 | 0 7 5 3 1 4 1 3 |
| 0.91 | 0 7 3 5 1 2 4 7 | 0 7 5 3 1 4 1 3 | 0 7 5 3 1 4 1 3 |
| 0.90 | 0 5 1 7 4 3 6 7 | 0 7 5 3 1 4 1 3 | 0 7 5 3 1 4 2 1 |
| 0.89 | 0 5 1 7 4 3 2 7 | 0 7 5 3 1 4 1 3 | 0 7 4 1 5 3 2 6 |
| 0.98 | 0 5 1 7 4 3 6 7 | 0 7 5 3 1 4 6 1 | 0 4 7 5 3 1 2 6 |
| 0.87 | 0 5 1 7 4 3 2 7 | 0 7 5 3 1 4 6 1 | 0 4 7 5 3 1 2 6 |
| 0.86 | 0 5 1 7 4 3 2 7 | 0 7 4 3 5 1 2 6 | 0 4 7 5 3 1 2 6 |
| 0.85 | 0 7 5 3 1 4 2 7 | 0 4 7 5 3 1 2 6 | 0 4 7 5 3 1 2 6 |
| 0.84 | 0 7 5 3 1 4 2 7 | 0 4 7 5 3 1 6 2 | 0 6 4 2 3 1 5 7 |
| 0.83 | 0 7 5 4 3 1 6 2 | 0 4 7 5 3 1 2 6 | 0 6 4 2 3 1 5 7 |
| 0.82 | 0 4 7 5 3 1 2 6 | 0 4 7 5 3 1 6 2 | 0 6 4 2 3 1 5 7 |
| 0.81 | 0 4 7 5 3 1 2 6 | 0 4 7 5 3 1 2 6 | 0 6 4 2 3 1 5 7 |
| 0.80 | 0 4 7 5 3 1 2 6 | 0 6 4 2 3 1 5 7 | 0 7 1 2 3 4 6 5 |
| 0.79 | 0 4 7 5 3 1 2 6 | 0 6 4 2 3 1 5 7 | 0 7 1 2 3 4 6 5 |
| 0.78 | 0 4 7 5 3 1 2 6 | 0 6 4 2 3 1 5 7 | 0 7 1 2 3 4 6 5 |
| 0.77 | 0 4 7 5 3 1 6 2 | 0 6 4 2 3 1 5 7 | 0 7 1 2 3 4 6 5 |
| 0.76 | 0 4 6 2 5 3 1 7 | 0 6 4 2 3 1 5 7 | 0 7 1 2 3 4 6 5 |
| 0.75 | 0 6 4 2 3 1 5 7 | 0 7 1 2 3 4 6 5 | 0 7 1 2 3 4 6 5 |
| 0.74 | 0 6 4 2 3 1 5 7 | 0 7 1 2 3 4 6 5 | 0 7 1 2 3 4 6 5 |
| 0.73 | 0 6 4 2 3 1 5 7 | 0 7 1 2 3 4 6 5 | 0 7 1 2 3 4 6 5 |
| 0.72 | 0 6 4 2 3 1 5 7 | 0 7 1 2 3 4 6 5 | 0 7 1 2 3 4 6 5 |
| 0.71 | 0 6 4 2 3 1 5 7 | 0 7 1 2 3 4 6 5 | 0 7 5 2 6 3 4 1 |
| 0.70 | 0 7 1 2 3 4 6 5 | 0 7 1 2 3 4 6 5 | 0 7 5 2 6 3 4 1 |
| 0.69 | 0 7 1 2 3 4 6 5 | 0 7 1 2 3 4 6 5 | 0 6 4 2 3 1 7 5 |
| 0.68 | 0 7 1 2 3 4 6 5 | 0 7 1 2 3 4 6 5 | 0 6 4 2 5 1 3 7 |
| 0.67 | 0 7 1 2 3 4 6 5 | 0 7 1 2 3 4 6 5 | 0 6 4 2 3 1 7 5 |
| 0.66 | 0 7 1 2 3 4 6 5 | 0 7 5 2 6 3 4 1 | 0 6 4 2 5 1 3 7 |

Fig. 8a

| | | | ← 800 |
|---|---|---|---|
| 0.65 | 07123465 | 07526341 | 06423175 |
| 0.64 | 07123465 | 06423175 | 06421573 |
| 0.63 | 07123465 | 06427351 | 04627153 |
| 0.62 | 06423175 | 06427351 | 07562143 |
| 0.61 | 07526314 | 06425137 | 07265143 |
| 0.60 | 06427315 | 06427315 | 07526143 |
| 0.59 | 06427315 | 04627351 | 07562143 |
| 0.58 | 06427315 | 07265143 | 07536421 |
| 0.57 | 06427351 | 07265314 | 04635712 |
| 0.56 | 06427351 | 07265314 | 04653721 |
| 0.55 | 04627351 | 07265314 | 04517362 |
| 0.54 | 07265314 | 05643172 | 04517362 |
| 0.53 | 07265143 | 04635712 | 04517362 |
| 0.52 | 07265314 | 04517362 | 04517362 |
| 0.51 | 07265314 | 04517362 | 04517362 |
| 0.50 | 04517362 | 04517362 | 04653172 |
| 0.49 | 04735621 | 04517362 | 05634721 |
| 0.48 | 04517362 | 04732651 | 07265143 |
| 0.47 | 04517362 | 04517362 | 07526143 |
| 0.46 | 04517362 | 07265314 | 06425173 |
| 0.45 | 04517362 | 07265314 | 06427315 |
| 0.44 | 04517362 | 07265314 | 06524137 |
| 0.43 | 07265314 | 06425173 | 06423175 |
| 0.42 | 07265314 | 06427315 | 07123465 |
| 0.41 | 07562143 | 06427315 | 07123465 |
| 0.40 | 06427315 | 07356241 | 07123465 |
| 0.39 | 06427315 | 07123465 | 07123465 |
| 0.38 | 06427315 | 07123465 | 07123465 |
| 0.37 | 07123465 | 07123465 | 07526134 |
| 0.36 | 07123465 | 07123465 | 06524137 |
| 0.35 | 07123465 | 06423175 | 06527143 |
| 0.34 | 07123465 | 07526341 | 07265143 |
| 0.33 | 07123465 | 06537214 | 04517362 |
| 0.32 | 07526341 | 07265314 | 04517362 |
| 0.31 | 06537214 | 04731562 | 05417362 |
| 0.30 | 07265314 | 04731562 | 07526143 |
| 0.29 | 04157362 | 05417362 | 07526341 |
| 0.28 | 04157362 | 07265314 | 06423175 |

Fig. 8b

|      |          |          |          |
|------|----------|----------|----------|
| 0.27 | 07341562 | 06524137 | 07123465 |
| 0.26 | 07526143 | 07123465 | 07123465 |
| 0.25 | 07241635 | 07123465 | 06423175 |
| 0.24 | 07123465 | 07526341 | 06527143 |
| 0.23 | 07123465 | 06537214 | 04517362 |
| 0.22 | 07526341 | 07536241 | 07265143 |
| 0.21 | 06537214 | 07514362 | 07526134 |
| 0.20 | 04517362 | 07246315 | 07123465 |
| 0.19 | 06537241 | 07123465 | 06423175 |
| 0.18 | 07123465 | 07526314 | 04157362 |
| 0.17 | 07123465 | 07514362 | 06527143 |
| 0.16 | 07536241 | 06537214 | 07123465 |
| 0.15 | 06527143 | 07123465 | 06527143 |
| 0.14 | 07123465 | 06527143 | 06537214 |
| 0.13 | 07341562 | 07526341 | 07526134 |
| 0.12 | 07526341 | 06537214 | 06527143 |
| 0.11 | 06537214 | 07526314 | 06527143 |
| 0.10 | 07123465 | 07514362 | 07123465 |
| 0.09 | 07246351 | 06537214 | 07123465 |
| 0.08 | 06423175 | 07514362 | 07123465 |
| 0.07 | 07123465 | 06527143 | 07514362 |
| 0.06 | 06527143 | 06527143 | 06527143 |
| 0.05 | 07123465 | 07123465 | 07123465 |
| 0.04 | 04157362 | 07526314 | 07123465 |
| 0.03 | 06537241 | 07123465 | 06527143 |
| 0.02 | 07123465 | 07536241 | 07123465 |
| 0.01 | 07123465 | 07123465 | 07123465 |

Fig. 8c

| Initial Code Rate $r_1$ | Optimal RV for $r_0=0.85$ | Optimal RV for $r_0=0.90$ | Optimal RV for $r_0=0.95$ |
|---|---|---|---|
| 0.99 | 07531213 | 07531213 | 07531213 |
| 0.98 | 07531213 | 07531213 | 07531413 |
| 0.97 | 07531213 | 07531413 | 07415362 |
| 0.96 | 07531213 | 07531413 | 06423157 |
| 0.95 | 07531413 | 07531426 | 07123465 |
| 0.94 | 07531413 | 07415362 | 07123465 |
| 0.93 | 07531421 | 07415326 | 07123465 |
| 0.92 | 07415326 | 06423157 | 07123465 |
| 0.91 | 04753126 | 06423157 | 07123465 |
| 0.90 | 07415326 | 07123465 | 07123465 |
| 0.89 | 07415326 | 07123465 | 07123465 |
| 0.88 | 06423157 | 07123465 | 07123465 |
| 0.87 | 06423157 | 07123465 | 07123465 |
| 0.86 | 06423157 | 07123465 | 07123465 |
| 0.85 | 07123465 | 07123465 | 07356214 |
| 0.84 | 07123465 | 07123465 | 07526314 |
| 0.83 | 07123465 | 07123465 | 06423175 |
| 0.82 | 07123465 | 07123465 | 07246315 |
| 0.81 | 07123465 | 07123465 | 07246315 |
| 0.80 | 07123465 | 07526314 | 06427315 |
| 0.79 | 07123465 | 07526341 | 06427351 |
| 0.78 | 07123465 | 07526134 | 06425137 |
| 0.77 | 07123465 | 07526314 | 06427315 |
| 0.76 | 07123465 | 06427315 | 06427315 |
| 0.75 | 07526341 | 06425137 | 06427351 |
| 0.74 | 06423175 | 06425137 | 07526143 |
| 0.73 | 07246315 | 06427351 | 07265314 |
| 0.72 | 06425137 | 06425173 | 07265314 |
| 0.71 | 06425137 | 04627153 | 07265314 |
| 0.70 | 06425137 | 07265314 | 07265143 |
| 0.69 | 06427315 | 07526143 | 05643172 |
| 0.68 | 06421753 | 07562143 | 04635712 |
| 0.67 | 04627315 | 07265143 | 04517362 |
| 0.66 | 07562143 | 07562143 | 04517362 |

Fig. 9a

|       |          |          |          |
|-------|----------|----------|----------|
| 0.65  | 07526143 | 05643172 | 04517362 |
| 0.64  | 07526143 | 04635721 | 04736251 |
| 0.63  | 07526143 | 04517362 | 04517362 |
| 0.62  | 07526143 | 04517362 | 04732651 |
| 0.61  | 04635712 | 04736251 | 04732651 |
| 0.60  | 04635712 | 04517362 | 04517362 |
| 0.59  | 04517362 | 04517362 | 05643172 |
| 0.58  | 04517362 | 04517362 | 07265143 |
| 0.57  | 04517362 | 04517362 | 07265314 |
| 0.56  | 04517362 | 04517362 | 07265143 |
| 0.55  | 04517362 | 07265314 | 04627153 |
| 0.54  | 04517362 | 07265314 | 06423175 |
| 0.53  | 04517362 | 07265143 | 07526314 |
| 0.52  | 07265314 | 06425173 | 07526314 |
| 0.51  | 07265314 | 06423175 | 07526314 |
| 0.50  | 07562143 | 07526134 | 07123465 |
| 0.49  | 06427315 | 07246315 | 07123465 |
| 0.48  | 06425137 | 07356241 | 07123465 |
| 0.47  | 06425137 | 07123465 | 07123465 |
| 0.46  | 06425137 | 07123465 | 07123465 |
| 0.45  | 07123465 | 07123465 | 07123465 |
| 0.44  | 07123465 | 07123465 | 07526341 |
| 0.43  | 07123465 | 07123465 | 06423175 |
| 0.42  | 07123465 | 07526134 | 06527143 |
| 0.41  | 07123465 | 07526134 | 07536421 |
| 0.40  | 07526134 | 06527143 | 07536214 |
| 0.39  | 07526134 | 07265143 | 04517362 |
| 0.38  | 07526314 | 07265314 | 04517362 |
| 0.37  | 07526314 | 04517362 | 04517362 |
| 0.36  | 07526314 | 04517362 | 07526314 |
| 0.35  | 04517362 | 04517362 | 06527143 |
| 0.34  | 04517362 | 07526143 | 07526314 |
| 0.33  | 04517362 | 06527143 | 07325614 |
| 0.32  | 07526143 | 07526314 | 07123465 |
| 0.31  | 06527143 | 07123465 | 07123465 |
| 0.30  | 07526314 | 07123465 | 07526314 |
| 0.29  | 07123465 | 07123465 | 07526143 |
| 0.28  | 07123465 | 07526341 | 07536241 |

| | | | |
|---|---|---|---|
| 0.27 | 06423175 | 06537214 | 04517362 |
| 0.26 | 06527143 | 07514362 | 06527143 |
| 0.25 | 05147326 | 07536241 | 07526314 |
| 0.24 | 04157362 | 07526143 | 07123465 |
| 0.23 | 06527143 | 07123465 | 07246315 |
| 0.22 | 07526314 | 07123465 | 06537214 |
| 0.21 | 07123465 | 06537241 | 07536271 |
| 0.20 | 07526143 | 07514362 | 07526314 |
| 0.19 | 07514362 | 06537214 | 07123465 |
| 0.18 | 06527143 | 07123465 | 06527143 |
| 0.17 | 07123465 | 06527143 | 04157362 |
| 0.16 | 06527143 | 06527143 | 07123465 |
| 0.15 | 06527143 | 07123465 | 06537214 |
| 0.14 | 07123465 | 07341562 | 07526134 |
| 0.13 | 04157362 | 07123465 | 07526134 |
| 0.12 | 07123465 | 07514362 | 07123465 |
| 0.11 | 06537214 | 06423175 | 06537214 |
| 0.10 | 07536241 | 07123465 | 07514362 |
| 0.09 | 07514362 | 07123465 | 07514362 |
| 0.08 | 06537214 | 07526143 | 07356241 |
| 0.07 | 07526134 | 07526134 | 07341562 |
| 0.06 | 07526134 | 07123465 | 07246315 |
| 0.05 | 07123465 | 07123465 | 07123465 |
| 0.04 | 06537214 | 07514362 | 07526341 |
| 0.03 | 06527143 | 07123465 | 06537214 |
| 0.02 | 04157362 | 07123465 | 07536241 |
| 0.01 | 07123465 | 07123465 | 07123465 |

Fig. 9c

METHOD AND APPARATUS FOR OPTIMAL REDUNDANCY VERSION (RV) SELECTION FOR UMTS HSDPA TRANSMISSIONS

BACKGROUND OF THE INVENTION

The present invention relates to wireless telecommunication networks. More particularly, and not by way of limitation, the present invention is directed to a method and apparatus for optimal selection of redundancy versions (RVs) for hybrid automatic repeat request (HARQ) operations in a Universal Mobile Telecommunications System (UMTS) High Speed Downlink Packet Access (HSDPA) transmission.

HARQ combines forward error correction (FEC) and automatic repeat request (ARQ) to achieve high data throughput. To place the present invention in context, a brief description of ARQ, FEC and HARQ is given below. ARQ is an error control scheme that relies on retransmitting data that is received with errors. In ARQ systems, messages are divided into blocks that are transmitted after a small number of parity bits or redundant bits have been added. The receiver uses the parity bits to detect errors that may have occurred during transmission. If errors are detected, the receiver requests a retransmission of the data blocks containing errors. ARQ is simple and achieves reasonable throughput when the error rate is low. Throughput diminishes, however, as the error rate increases because of the need to resend more data. FEC employs error-correcting codes to detect and correct errors that occur during transmission by adding redundancy to the information bits before they are transmitted. Shannon's channel coding theorem states that there always exists a coding scheme that enables information to be transmitted with arbitrarily small error probabilities provided that the data rate (including that due to the added redundancy) over the communication channel is less than the channel capacity. The redundancy enables the receiver to detect and correct errors without having to retransmit the information bits. FEC achieves a constant throughput rate regardless of error rate. However, because of fading channel condition and possible inaccuracy in link adaptation, the probability of a decoding error in systems employing FEC only can be greater than the probability of an undetected error in ARQ systems. To obtain high system reliability, a long powerful code that increases system complexity and expense may be required. HARQ systems combine ARQ and FEC to improve throughput as compared to pure ARQ systems with less complexity than pure FEC systems. The basic idea underlying HARQ is to use FEC to first detect and correct errors, and, if the errors are not correctable, to request retransmission. HARQ systems use an error correction code as an inner code and an error detection code as an outer code. If the number of errors in the message is within the capabilities of the error correction code, the errors will be corrected without the need for retransmission. If, however, the number of errors in the message exceeds the capabilities of the error correcting code, the receiver requests retransmission of the message.

Two types of HARQ modes are conventionally used. When higher order modulations (HOM), such as, but not limited to 16-ary Quadrature Amplitude Modulation (16QAM), are used in HARQ, a variation to the type-I HARQ is also enabled.

In a type-I HARQ system, a coded packet is transmitted initially and, if the receiver fails to decode the packet, a retransmission request in the form of non-acknowledgment (NACK) is fed back to the transmitter. Upon reception of this NACK, the transmitter sends the same coded packet again. This type of HARQ is commonly referred to as Chase combining (CC) in the wireless industry.

In the type-II HARQ scheme, instead of sending the same coded packets, the transmitter attempts to construct and send additional coded parities when a NACK is received. This is also known as an incremental redundancy (IR) scheme.

When HOMs are used, a third variation to the type-I HARQ is enabled by transmitting the same coded bits but in conjunction with a different bit-to-symbol mapping. For instance, four exemplary choices of such mappings 101, 102, 103, 104 for 16QAM are illustrated in FIG. 1. This is referred to as the bit-remapped Chase combining (BRMCC).

Based on a simplified assumption of the exact operational details, the following factors that affect gains and relative advantages of HARQ protocols have been identified:

$r_1$: the initial coding rate of the packet or block to be transmitted. The higher the initial coding rate, the higher the IR gains. For higher order modulations, the BRMCC gains also increase with the initial coding rate in general. In general, IR is preferred with high $r_1$ and BRMCC is preferred for HOMs with low $r_1$;

$r_0$: the mother code rate from which HARQ operation is derived. The higher the mother code rate, the lower the IR gains; and SNR: the signal-to-noise ratio. The faster the SNR changes between transmissions, the lower the gains of IR and BRMCC. It has been shown that systematic bits of the turbo codes should receive higher protection but not highest priority.

Guidelines for type-II HARQ adaptation based on ideal behaviors of the rate matching (RM) agent that constructs different RVs are generally known. In particular, it is assumed that such a RM agent shall provide as many not-yet-used coded bits when instructed to operate in the IR mode. For instance, in UMTS, the mother code rate is normally $r_0=\frac{1}{3}$. Hence, if an initial transmission with code rate $r_1=0.8$ is reported as NACK, an ideal RM agent for IR operation shall be able to provide a RV consisting of unused coded bits only.

However, the exact behaviors of the HSDPA RM agent as defined in the Third Generation Partnership Project (3GPP) Technical Specification 3GPP TS 25.212, "Multiplexing and channel coding (FDD)" do not conform to this optimal condition. FIG. 2 provides an overview of the HSDPA RM procedure. The procedure is divided into two stages.

As seen therein, in the first stage 201, a rate ⅓ UMTS turbo codeword is rate-matched such that the output codeword can fit within a buffer size available at the receiver. If the original codeword length is smaller than the receiver buffer size, this stage can be transparent (i.e., output is identical to the input). This RM stage determines the effective mother code rate $r_0$ in accordance with the following equation $$r_0 = \frac{N_{sys}}{N_{sys} + N_{p1} + N_{p2}} \quad (1)$$

where $N_{sys}$, $N_{p1}$, and $N_{p2}$ are defined in Section 4.5.4 of 3GPP TS 25.212, "Multiplexing and channel coding (FDD)" (see also FIG. 2). In the second stage 202, the codeword is further rate-matched to the code rate specified by the current transmission format. The RM stage determines the initial code rate $r_1$ in accordance with the following equation:

$$r_1 = \frac{N_{sys}}{N_{data}} \qquad (2)$$

where $N_{sys}$ and $N_{data}$ are defined in Section 4.5.4 of 3GPP TS 25.212, "Multiplexing and channel coding (FDD)" (see also FIG. 2).

For each of the QPSK and 16QAM modes in HSDPA, eight different RVs are defined in the 3GPP TS 25.212 by specifying parameters for the second-stage RM and the bit-to-symbol mapping. These definitions are repeated in the Tables 300 and 400 of FIGS. 3 and 4.

It will be seen that many of the HSDPA RVs are mixtures of all three types of HARQ protocols described above. It is hence necessary to refine and tailor the procedures to HSDPA operations. What is desired are new procedures and solutions to account for the specific and idiosyncratic properties of the HSDPA RVs. Solutions are required to overcome the following problems identified in the UMTS HSDPA Specification:

HSDPA RM agent repeats bits when there are still unused bits. Best RVs for IR operation need to be searched;

exact behaviors of the RM agent depend on the block lengths;

first stage RM effectively increases the mother code rate and, hence, decreases the gains of the IR protocols;

when bits can be repeated, proper prioritization between systematic and parity bits are needed; and counter-measures against fast changing channel conditions are needed.

Thus, it would be advantageous to have a system and method that overcomes the cited disadvantages of the prior art. The present invention provides such a system and method.

BRIEF SUMMARY OF THE INVENTION

The present invention comprises several embodiments with different levels of implementation complexity of a method and system for identifying optimal RV sequences for HSDPA transmissions based on extensive search. An SNR tracking algorithm is provided in conjunction with the optimal sequences for robust HARQ operations. The present invention provides a number of advantages over the prior art, including, but not limited to: the sequences provide highest gains from HARQ operations. Hence, the numbers of retransmissions are minimized and data throughputs are maximized. In addition, the tracking and adaptation algorithms provide robustness against unusual channel condition variations that could otherwise degrade HARQ performance significantly.

BRIEF DESCRIPTION OF THE SEVERAL VIEWS OF THE DRAWING

In the following section, the invention will be described with reference to exemplary embodiments illustrated in the figures, in which:

Figure 1:
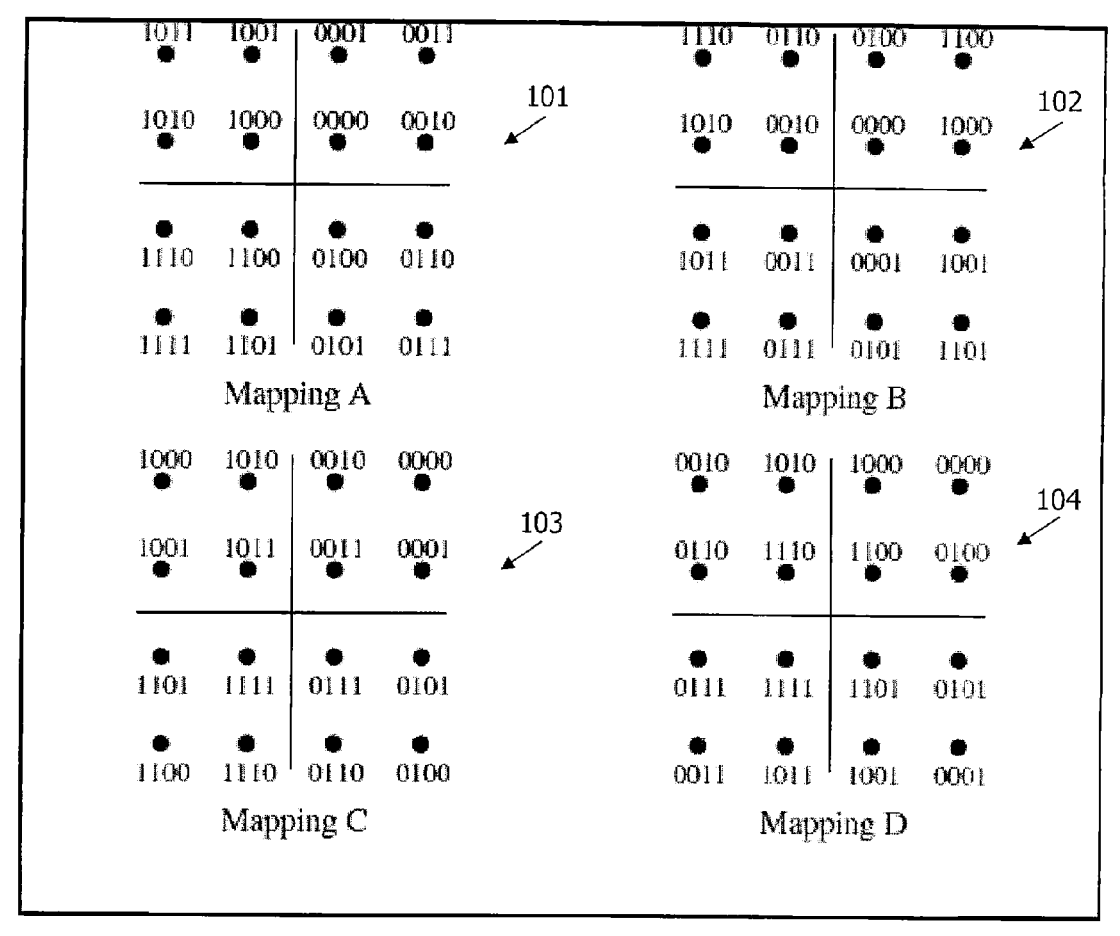

FIG. 1 illustrate four exemplary choices for 16QAM mappings;

FIG. 3 is a table illustrating redundancy version (RV) coding for QPSK;

FIG. 4 is a table illustrating RV coding for 16QAM;

FIG. 5($a$)-($b$) is a table illustrating the Optimal QPSK RV Sequence for Transparent Stage-One Rate Matching of the third embodiment of the present invention;

FIG. 7($a$)-($c$) is a table illustrating the Optimal Sequences for Effective Mother Code Rates of 0.55, 0.60, 0.65;

FIG. 8($a$)-($c$) is a table illustrating the Optimal Sequences for Effective Mother Code Rates of 0.70, 0.75, 0.80;

FIG. 9($a$)-($c$) is a table illustrating the Optimal Sequences for Effective Mother Code Rates of 0.85, 0.90, 0.95.

DETAILED DESCRIPTION OF THE INVENTION

Figure 10:
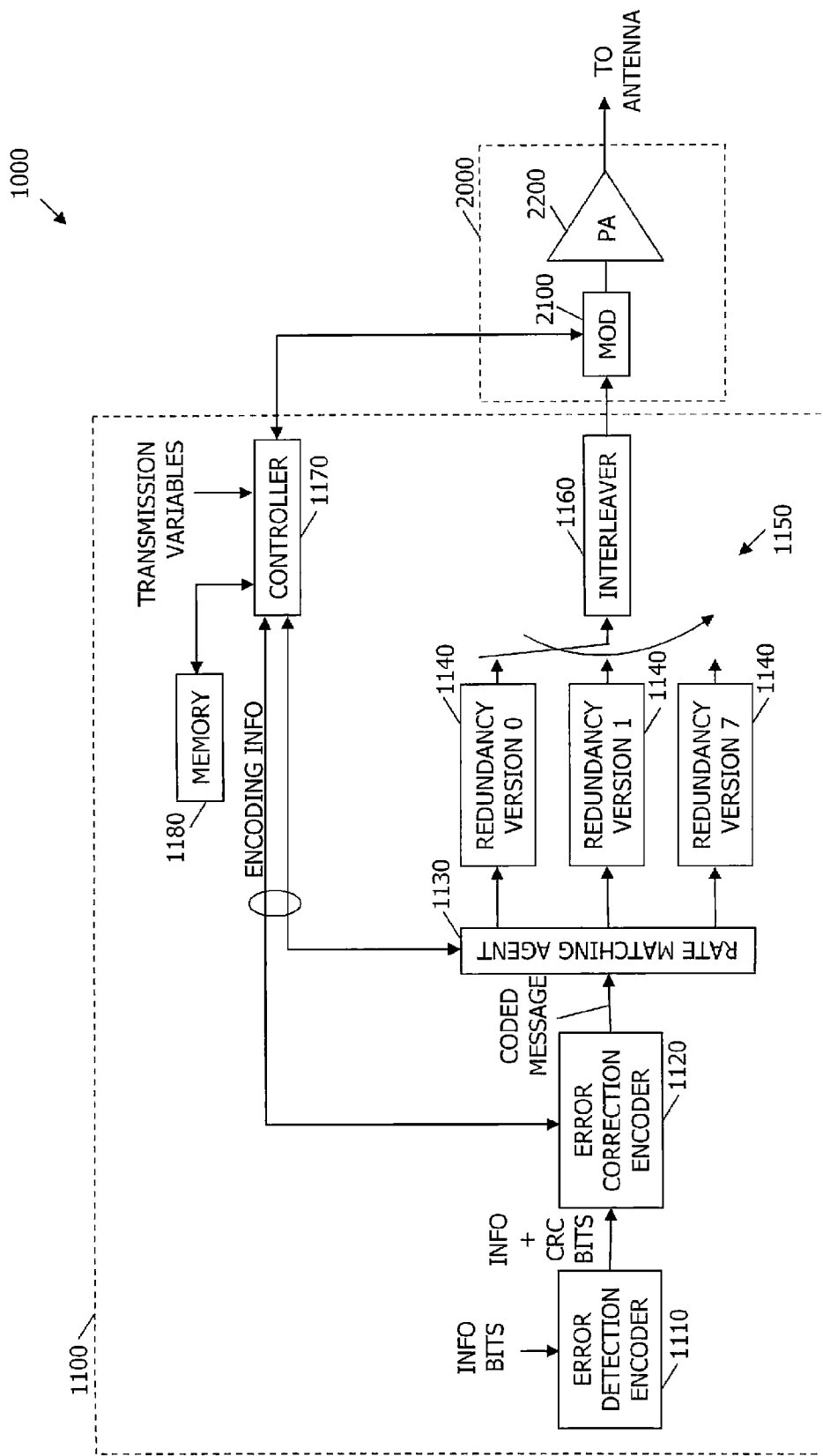
FIG. 10 is a block diagram of an transmitting apparatus adapted to perform the methods of the present invention.

The tables of FIGS. 5($a$)-($b$) to 9($a$)-($c$) are described in more detail below, wherein FIG. 5($a$)-($b$) is a table illustrating the Optimal QPSK RV Sequence for Transparent Stage-One Rate Matching of the third embodiment of the present invention; FIG. 6($a$)-($c$) is a table illustrating the Optimal Sequences for Effective Mother Code Rates of 0.40, 0.45, 0.50 in accordance with the fourth embodiment of the present invention; FIG. 7($a$)-($c$) is a table illustrating the Optimal Sequences for Effective Mother Code Rates of 0.55, 0.60, 0.65; FIG. 8($a$)-($c$) is a table illustrating the Optimal Sequences for Effective Mother Code Rates of 0.70, 0.75, 0.80; and FIG. 9($a$)-($c$) is a table illustrating the Optimal Sequences for Effective Mother Code Rates of 0.85, 0.90, 0.95. Referring now to FIG. 10, FIG. 10 illustrates an exemplary wireless transmitter 1000 for transmitting messages according to the present invention. For purposes of this application, the term message is used herein to mean a sequence of bits to be transmitted. The sequence of bits may include information bits, header bits, check bits, i.e., CRC bits, and/or parity bits. The information bits may represent user data or may comprise control message data. Transmitter 1000 may be employed, for example, in a mobile terminal or a base station in a wireless communication system. Transmitter 1000 comprises a baseband transmission section 1100 and a radio frequency (RF) transmission section 2000. Baseband transmission section 1100 comprises an error detection encoder 1110, an error correction encoder 1120, rate matching agent 1130, one or more redundancy version 1140, an optional switch 1150, and interleaver 1160. Baseband transmission section 1100 may, for example, comprise a digital signal processor or other signal processing circuits. Transmitter 1000 operates under the direction of controller 1170 that executes program instructions stored in a memory 1180. While controller 1170 is shown as part of transmitter 1000, it will be understood by those skilled in the art that controller 1170 may be part of a system controller. Error detection encoder 1110 may comprise any error detection encoder known in the art. For example, error detection encoder 1110 may comprise a cyclic redundancy check (CRC) encoder. CRC codes are commonly used in ARQ systems because they are capable of detecting large numbers of errors with a minimum amount of redundancy. Error detection encoder 1110 uses a CRC code to generate check bits that are appended to messages prior to transmission of the message. The check bits are used at the receiver to detect errors that occur during transmission. The error detection encoder 1110 operates in the context of the present invention as an outer encoder. Error correction encoder 1120 uses a forward error correcting code to encode messages (including check bits added by error detection encoder 1110) for transmission so as to enable the detection and correction of bit errors at the receiver. Error correction encoder 1120 operates in the present invention as an inner encoder. Error correction encoder 1120 may comprise, for example, a block encoder, a convolutional encoder, a turbo encoder, or any other known error correction encoder. The particular type of error correcting coding is not material to the present invention and any known type of error correction coding may be used to practice the present invention. By way of example, the invention may use parallel-concatenated turbo codes for the UMTS systems, which are described in Section 4.2.3 of 3GPP Technical Specification 25.212. The output of error correction encoder 1120 comprises a coded message. Rate matching agent 1130 is adapted to construct different redundancy versions. For the exemplary HSDPA transmissions in an UMTS system, the operations of the rate matching agent are described in 4.2.3 of 3GPP Technical Specification 25.212. Each different redundancy version 1140 is output from rate matching agent 1130. Controller 1170 controls switch 1150 to select a redundancy version of the coded message for transmission by actuating switch 1150 to selectively connect the selected redundancy version 1140 to interleaver 1160. It will be understood by those skilled in the art that rate matching agent 1130 may be a stand-alone device, as shown in FIG. 10, or it may be combined with either error correction encoder 1120 or interleaver 1160. Interleaver 1160 pseudo-randomly rearranges the order of the bits in the coded message to randomize the location of errors that may occur during transmission. Further, while FIG. 10 shows interleaver 1160 following the redundancy version 1140, those skilled in the art will appreciate that the present invention does not require this particular arrangement. For example, interleaver 1160 may be positioned in front of the rate matching agent. RF transmission section 2000 includes a modulator 2100 and a power amplifier 2200. Modulator 2100 maps the interleaved bits of the coded message onto a signal carrier according to any known modulation scheme, such as QPSK, 16QAM, or the like. Modulator 2100 may be operative to generate multiple mappings according to a specified modulation scheme. Power amplifier 2200 provides a predetermined amount of amplification to the modulated message before an antenna (not shown) transmits the modulated message. Controller 1170 includes logic circuitry to control the operation of the transmitter 1000 according to program instructions stored in memory 1180 and according to transmission variables. According to at least one embodiment, the memory 1180 may also comprise at least one table of redundancy version sequences to be accessed by the controller 1170. As noted, the present invention is adapted to adaptively select a retransmission version from a plurality of RVs based on at least one changing transmission variable, wherein the adaptive selection is based on either the number of retransmissions of the message or a change in a channel quality between a systematic transmission of the message and a subsequent transmission of the message. The controller 1170 may also control other aspects of the device in which the transmitter 1000 may be incorporated. Controller 1170 may comprise, for example, a single microcontroller or microprocessor. Alternatively, two or more such devices may implement the functions of controller 1170. Controller 1170 may be incorporated within a custom integrated circuit or application specific integrated circuit (ASIC). Memory 1180 may be incorporated into controller 1170, or may comprise a discrete memory device, such as random access memory (RAM), read only memory (ROM), electrically erasable programmable read only memory (EEPROM), and FLASH memory. Memory 1180 may be part of the same ASIC as the controller 1170. The controller 1170 is programmed to implement an adaptive hybrid automatic repeat request (HARQ) protocol.

The adaptive selection of redundancy versions according to the present invention will now be described. In its broadest terms, a transmitter 1000 implementing the present invention adaptively selects a retransmission protocol from two or more possible retransmission protocols based on a changing transmission variable. The term transmission variable as used herein refers to any variable that effects the transmission of data from a transmitter 1000 to a receiver. The transmission variable may be a controllable parameter, such as the code rate or modulation used for transmission, or an uncontrolled variable, such as a time-varying variable that characterizes the quality of the communication channel, i.e., a signal to noise ratio (SNR) of the communication channel. When the receiver requests retransmission, transmitter 1000 selects a redundancy version based on an evaluation of one or more transmission variables. According to the exemplary embodiment illustrated in FIG. 10, rate matching agent 1130 generates different versions of the coded message and transfers them to respective redundancy versions 1140. Each redundancy version of the coded message comprises a subset of the coded message bits output from error correction encoder 1120. Further, each version of the coded message includes header bits containing instructions for the receiver, as is well known in the art. Transmitter 1000 transmits the first version of the coded message, e.g. redundancy vestion 0, A, in the initial transmission. If the message does not decode properly, the receiver sends a negative acknowledgement (NACK) back to transmitter 1000 to trigger retransmission. In response to the NACK, controller 1170 causes transmitter 1000 to retransmit the message. Controller 1170 may also initiate retransmission of the message if transmitter 1000 does not receive a positive acknowledgement (ACK) within a predetermined time after the initial transmission. When retransmission is triggered, controller 1170 determines which redundancy version to employ based on at least one changing transmission variable.

The present invention comprises a method and apparatus for identifying optimal redundancy version (RV) sequences for HSDPA transmissions based on extensive search. The method of the present invention, and an apparatus implementing such invention, is used in communicating a message from a transmitting station to a receiving station. The method, and apparatus that implements the method, adaptively selects a retransmission version from a plurality of RVs based on at least one changing transmission variable, wherein the adaptive selection is based on either the number of retransmissions of the message or a change in a channel quality between a systematic transmission of the message and a subsequent transmission of the message. If the selection is based on the latter, then the adaptive selection of the retransmission version is based on a change in a signal to noise ratio between the systematic transmission of the message and the subsequent transmission of the message. Further, if the adaptive selection of the retransmission version is based on the change in the signal to noise ratio between the systematic transmission of the message and the subsequent transmission of the message, then the present invention further includes the selection of a systematic retransmission when the change in the signal to noise ratio is greater than four times. The method of the present invention, and apparatus that implements the method, further includes adaptively selecting the retransmission version from a plurality of RVs based on at least one changing transmission variable that includes adaptively selecting the retransmission version based on (1) the modulation type for a first transmission of the message; (2) the initial coding rate used for a first transmission of the message; and (3) the mother coding rate used for the transmission of the message.

The method of the present invention, and apparatus that implements the method, also includes adaptively selecting the retransmission version from a plurality of RVs defined for a Universal Mobile Telecommunications System (UMTS) High Speed Downlink Packet Access (HSDPA) transmission, and includes adaptively selecting the HSDPA retransmission version based on the number of retransmissions of the message. Exemplary embodiments of the method with different levels of implementation complexity are disclosed herein. An SNR tracking algorithm is provided in conjunction with the optimal sequences for robust HARQ operations.

A first embodiment of the present invention used in HSDPA QPSK and 16QAM modes is as follows: For HSDPA QPSK, the transmitter retransmits according to the RV sequence [0 7 3 4 1 6 5 2]. That is, the initial transmission is based on $X_{rv}=0$, the second transmission is based on $X_{rv}=7$, the third transmission is based on $X_{rv}=3$, and so forth. It is also meant that the RV sequence is used cyclically. That is, the ninth transmission shall be based on $X_{rv}=0$. For HSDPA 16QAM mode, the transmitter retransmits according to the RV sequence [0 1 3 4 5 6 7 1].

A second embodiment of the present invention used in HSDPA QPSK and 16QAM modes is as follows: For HSDPA QPSK mode, the transmitter retransmits according to the RV sequence [0 7 3 4 1 6 5 2] if the initial coding rate $r_1$ (as defined in Equation 2) is greater than or equal to 0.5. The transmitter shall retransmit according to the RV sequence [0 4 3 6 2 1 6 2] if the initial coding rate $r_1$ is less than 0.5. For HSDPA 16QAM mode, the transmitter retransmits according to the RV sequence [0 1 3 4 5 6 7 1] if the initial coding rate $r_1$ as defined in Equation 2 is greater than or equal to 0.5. The transmitter retransmits according to the RV sequence [0 4 5 6 0 4 5 6] if the initial coding rate $r_1$ is less than 0.5.

A third embodiment of the present invention used in HSDPA QPSK and 16QAM modes is as follows: The transmitter retransmits according to the RV sequence according to each specific initial coding rate $r_1$. An exemplary table 500 for HSDPA QPSK mode is provided in FIG. 5(a)-(b), which illustrates the Optimal QPSK RV Sequence for Transparent Stage-One Rate Matching.

Figure 2:
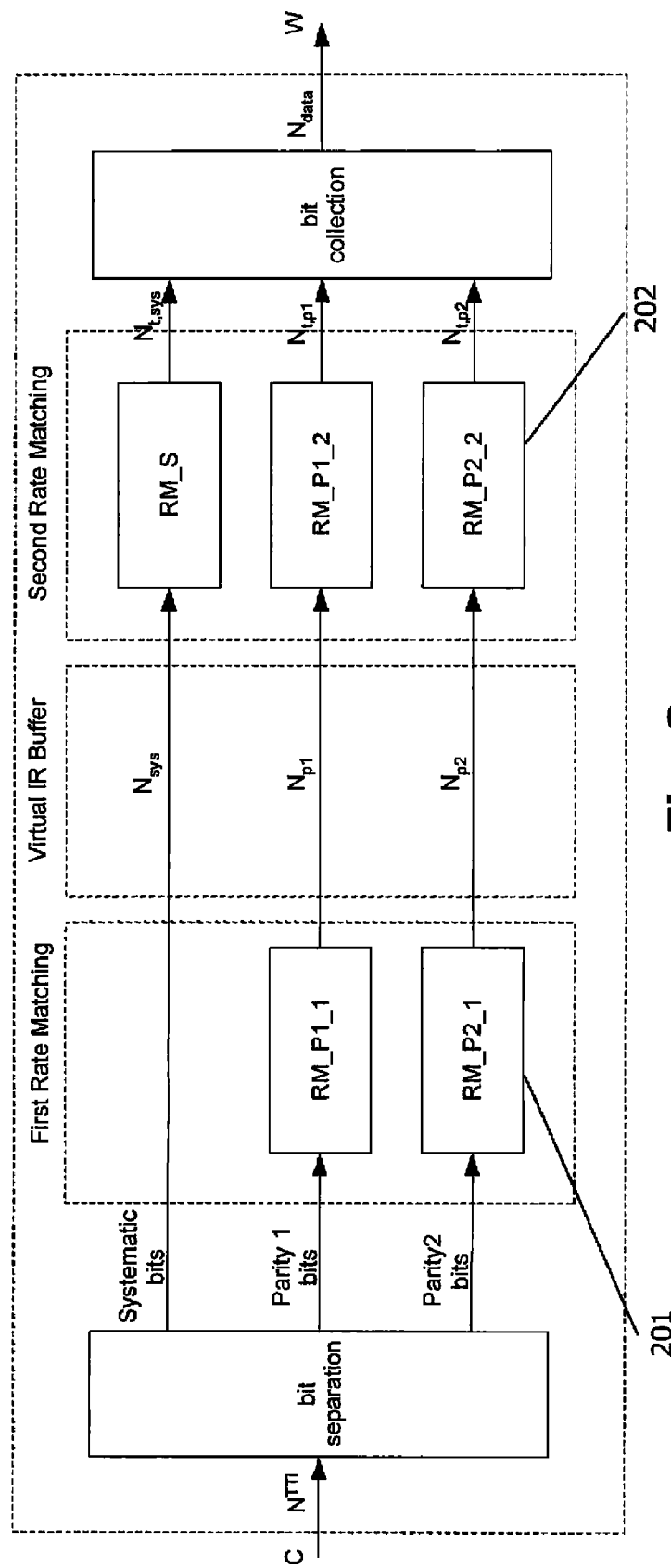
FIG. 2 illustrates an overview of the HSDPA RM procedure.
Figure 6B:
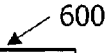
FIG. 6($a$)-($c$) is a table illustrating the Optimal Sequences for Effective Mother Code Rates of 0.40, 0.45, 0.50 in accordance with the fourth embodiment of the present invention.

A fourth embodiment of the present invention used in the HSDPA QPSK mode is as follows: The transmitter retransmits according to the RV sequence according to each specific initial coding rate $r_1$ and each specific mother code rate, as defined in Equation 1. Exemplary table 600 of FIG. 6(a)-(c) illustrates the Optimal Sequences for Effective Mother Code Rates of 0.40, 0.45, 0.50 in accordance with the fourth embodiment of the present invention. Exemplary table 700 of FIG. 7(a)-(c) illustrates the Optimal Sequences for Effective Mother Code Rates of 0.55, 0.60, 0.65. Exemplary table 800 of FIG. 8(a)-(c) illustrates the Optimal Sequences for Effective Mother Code Rates of 0.70, 0.75, 0.80. Exemplary table 900 of FIG. 9(a)-(c) illustrates the Optimal Sequences for Effective Mother Code Rates of 0.85, 0.90, 0.95.

A fifth embodiment of the present invention is as follows: The SNR tracking and adaptation algorithm described in the section "Incorporating fast fading counter-measures into the optimal RV sequences" is used in conjunction with any of the previous four embodiments.

Using the QPSK mode as an example, problems associated with the HSDPA HARQ operations are described, and then the solutions provided by the present invention are disclosed.

RVs in support of the HARQ operation for HSDPA QPSK mode are defined based on different combinations of two parameters, s and r, where s specifies whether to prioritize systematic bits and r specifies the starting phase of the rate matching. When s=1, all systematic bits will be transmitted and when s=0, systematic bits will be transmitted only after parity bits have been exhausted. Hence, an RV where s=1 can be referred to as a systematic RV and a transmission of a message using a systematic RV can be referred to as a systematic transmission of said message.

There are eight different RVs in total as shown in FIG. 3. Previous analysis indicates that higher coding gains can be obtained by selecting RVs in retransmissions such that as many coded bits can be used without repetition as possible. For instance, if the initial coding rate is $r_1=3/4$, there are enough parity bits to be used in the second transmission without repeating any bits that are already used in the first transmission. An ideal rate matcher should choose from this pool of parity bits for the second transmission. However, the HSDPA RM mechanism does not behave like an ideal case. The optimization objectives of the present invention, thus, can be seen in the following examples of conventional cases:

In a first example, disadvantageously, the HSDPA RM repeats bits when there are still unused bits. Consider the eight RVs for the case of $N_{sys}=44$ bits, where $N_{sys}$ is defined in Section 4.5.4 of 3GPP TS 25.212, "Multiplexing and channel coding (FDD)", and an initial coding rate of $r_1=3/4$. First, the eight versions of the systematic stream are as follows:

| | |
|---|---|
| $X_{rv}=0$, | 11111111111111111111111111111111111111111111 |
| $X_{rv}=1$, | 00000000000000000000000000000000000000000000 |
| $X_{rv}=2$, | 11111111111111111111111111111111111111111111 |
| $X_{rv}=3$, | 00000000000000000000000000000000000000000000 |
| $X_{rv}=4$, | 11111111111111111111111111111111111111111111 |
| $X_{rv}=5$, | 00000000000000000000000000000000000000000000 |
| $X_{rv}=6$, | 11111111111111111111111111111111111111111111 |
| $X_{rv}=7$, | 00000000000000000000000000000000000000000000 | where one indicates that the systematic bit at the corresponding position shall be transmitted and zero indicates puncturing of the corresponding bit. Next, the eight different versions for the first parity stream are as follows:

| | |
|---|---|
| Xrv = 0, | 0001000001000001000001000001000001000001000 |
| Xrv = 1, | 1011011011011011011010101101101101101101101 |
| Xrv = 2, | 0000100000010000010000010000001000000100000010 |
| Xrv = 3, | 0110110110110110110110110110110110101011011011011 |
| Xrv = 4, | 1000001000001000001000001000001000001000000 |
| Xrv = 5, | 1101101101101101101101101101101101101011011010 |
| Xrv = 6, | 0100000100000010000010000001000001000000100000010000 |
| Xrv = 7, | 1101101101011011011011011011011011011011011011010110110 |

And, lastly, the eight different versions for the second parity steam are as follows:

| | |
|---|---|
| Xrv = 0, | 1000001000001000001000001000001000001000000 |
| Xrv = 1, | 1101101101101101101101101101101101101011011010 |
| Xrv = 2, | 0100000100000010000010000001000001000000100000010000 |
| Xrv = 3, | 1101101101011011011011011011011011011011011011010110110 |
| Xrv = 4, | 0001000001000001000001000001000001000001000 |
| Xrv = 5, | 1011011011011011011010101101101101101101101 |
| Xrv = 6, | 0000100000010000010000010000001000000100000010 |
| Xrv = 7, | 0110110110110110110110110110110110101011011011011 |

It can be seen that only 14 out of the 88 parity bits are used in the first transmission with $X_{rv}=0$. Ideally, for highest IR gains, 58 parity bits should be selected from the 74 not-yet-used bits for the second transmission. However, none of the next seven RVs achieves this optimal selection. In particular, it is seen that for $X_{rv}$=[0 1] and $X_{rv}$=[0 5] RV sequences, 14 coded bits are repeated after two transmissions while 30 bits are still left unused. The $X_{rv}$=[0 3] sequence is better behaved as 8 bits are repeated and 24 bits are not used after two transmissions. The $X_{rv}$=[0 7] RV sequence achieves the best performance: only 6 bits are repeated and 22 bits unused after two transmissions. For this particular case, the optimal RV sequence for two transmissions turns out to be $X_{rv}$=[0 7] instead of the obvious choice of $X_{rv}$=[0 1].

Basic Search Strategy

For a systematic search of optimal RV sequences, theoretical results that are known can be reviewed. That is, for each initial coding rate $r_1$ and each number of transmissions, the performance of an RV sequence can be graded based on the following accumulative conditional mutual information (ACMI) formula:

$$ACMI = \frac{1}{N_{data}} \sum_b N_b \cdot C(b \cdot SNR) \quad (3)$$

where $N_{data}$ is the number of total coded bits, $N_b$ is the number of bits that are repeated b times, C(b*SNR) is the capacity function of the modulation format. For this search, SNR is set to the typical signal-to-noise ratio required for that coding rate. For example, the ACMI value of the $X_{rv}$=[0 1] and the $X_{rv}$=[0 7] sequences are given, respectively, by:

$$ACMI_{01} = \frac{1}{58}[88 \cdot C(SNR) + 14 \cdot C(2SNR)] = 1.529$$

$$ACMI_{07} = \frac{1}{58}[104 \cdot C(SNR) + 6 \cdot C(2SNR)] = 1.629$$

Using this ACMI scoring system, it can be seen that $X_{rv}$=[0 7] is the optimal RV sequence for two transmissions. This basic search strategy is further modified and enhanced to deal with the problems and issues identified in the next example:

In a second example, disadvantageously, exact HSDPA RM patterns depend on block lengths. The exact puncturing/repetition patterns of the HSDPA rate matching can change even with a slight variation in the block length. Consider the first of two cases as follows: $N_{sys}$=2048. The optimal sequence is $X_{rv}$=[0 7] with 5.5% of available coded bits repeated twice and 16.7% of available coded bits unused. The third place is $X_{rv}$=[0 1] with 11.1% of available coded bits repeated twice and 22.2% of available coded bits unused.

Consider the second of two cases, $N_{sys}$=2051, as follows: The optimal sequence is $X_{rv}$=[0 1] with 3.3% of available coded bits repeated twice and 14.5% of available coded bits unused. The second place is $X_{rv}$=[0 7] with 7.8% of available coded bits repeated twice and 18.9% of available coded bits unused. Because of the transport block concatenation and code block segmentation procedure of Section 4.2.2 of 3GPP TS 25.212, "Multiplexing and channel coding (FDD), there are thousands of possible block lengths. It is particularly disadvantageous to specify block-length-dependent RV sequences. Therefore, the present invention searches the RV sequences based on the average ACMI scores of eight hypothesized lengths corresponding to $N_{sys}$=2048, 2049, . . . 2055 bits. Based on the average score, it can be found that $X_{rv}$=[0 7] and $X_{rv}$=[0 3] are equally desirable for $r_1$=¾ after two transmissions.

Controlled Bias Toward Systematic Bits for Robustness

As has been noted, systematic bits are of high importance to turbo decoding. Hence, it is desirable introduce a bias to choose systematic over parity bits when repetition is needed. This is illustrated with the case of $N_{sys}$=44 bits and initial coding rate of $r_1$=½. The eight versions of the systematic stream are identical to those listed above when HSDPA RM repeats bits when there are still unused bits. The eight versions of the first parity stream are as follows:

| | |
|---|---|
| $X_{rv}$ = 0, | 01010101010101010101010101010101010101010101 |
| $X_{rv}$ = 1, | 11111111111111111111111111111111111111111111 |
| $X_{rv}$ = 2, | 01010101010101010101010101010101010101010101 |
| $X_{rv}$ = 3, | 11111111111111111111111111111111111111111111 |
| $X_{rv}$ = 4, | 10101010101010101010101010101010101010101010 |
| $X_{rv}$ = 5, | 11111111111111111111111111111111111111111111 |
| $X_{rv}$ = 6, | 10101010101010101010101010101010101010101010 |
| $X_{rv}$ = 7, | 11111111111111111111111111111111111111111111 |

The eight versions of the second parity stream are:

| | |
|---|---|
| $X_{rv}$ = 0, | 10101010101010101010101010101010101010101010 |
| $X_{rv}$ = 1, | 11111111111111111111111111111111111111111111 |
| $X_{rv}$ = 2, | 10101010101010101010101010101010101010101010 |
| $X_{rv}$ = 3, | 11111111111111111111111111111111111111111111 |
| $X_{rv}$ = 4, | 01010101010101010101010101010101010101010101 |
| $X_{rv}$ = 5, | 11111111111111111111111111111111111111111111 |
| $X_{rv}$ = 6, | 01010101010101010101010101010101010101010101 |
| $X_{rv}$ = 7, | 11111111111111111111111111111111111111111111 |

It can be found that the bits transmitted according to $X_{rv}$=[0 2] are, in fact, identical to those in the initial transmission. That is, the "IR RV sequence" of $X_{rv}$=[0 2] is actually a CC RV sequence as is $X_{rv}$=[0 0]. The other six RV sequences ([0 1], [0 3], [0 5], [0 7], [0 4] and [0 6]) are true IR sequences and have equivalent statistics: all coded bits are used and one third of them are repeated twice. However, for the four RV sequences [0 1], [0 3], [0 5] and [0 7], the repetition is given to the parity bits. For the other two sequences [0 4] and [0 6], the systematic bits are repeated. In such case, it would be desirable to devise a systematic method to choose the systematic RVs [0 4] and [0 6] over the other four (non-systematic) candidates. However, the bias should be carefully designed such that it does not over-write solutions in non-repetition cases since a pure systematic-priority IR policy achieves little gains over Chase combining. The present invention provides 10% more weight to systematic bits in the evaluation of ACMI. That is, equation (3) above is modified to:

$$ACMI = \frac{1}{N_{data}} \sum_b N_b \cdot C(b \cdot SNR) + \frac{0.1}{N_{data}} \sum_b I_b \cdot C(b \cdot SNR) \quad (4)$$

where $I_b$ is the number of systematic bits that are repeated b times. For example, with this new scoring method, it is found that the optimal RV sequence for $r_1$=½ after two transmissions is $X_{rv}$=[0 4]. This is because $X_{rv}$=[0 6] performs worse than $X_{rv}$=[0 4] whenever $N_{sys}$ is an odd number (i.e., 2049, 2051, . . . , 2055).

Additional Details of the Search Algorithm of the Present Invention

Since the first stage RM effectively raised the mother code rate, the RV sequences must be optimized for the specific pair of mother code rate $r_0$ and initial code rate $r_1$. To guarantee least number of transmissions, the optimization is performed in increasing number of transmissions. That is, an optimal RV sequence for three transmissions is derived from the optimal RV sequence for two transmissions.

However, to avoid switching different RV sequences rapidly for even slightly different coding rates, a controlling mechanism is provided. At the end of each optimization stage, 10 top candidates that score very closely to the optimal solution are kept as roots for the next-stage optimization. At the end of the optimization for eight transmissions, the 10 surviving candidates are checked with the optimal solution of a near-by code rate. If any of the 10 survivors are identical to that optimal solution, it will be selected as the optimal solution of the current code rate.

Incorporating Fast Fading Counter-Measures Into the Optimal RV Sequences

It has been identified that, contrary to conventional assumptions, the IR protocol can sometimes perform worse than the CC protocol. This occurs when the systematic bits of the turbo code are received with unexpected low power. As a result, the systematic bits are effectively erased as far as turbo decoding is concerned. Based on the initial code rate $r_1$ and the effective mother code rate $r_0$ parameters, 13 tables have been constructed of 99 sequences each using the proposed search algorithm.

Optimal RV tables are adopted based on static channel assumptions and so as to handle fast fading conditions with a tracking algorithm. Based on simulation results, the following algorithm provides sufficient robustness against fast fading conditions: Let $SNR_f$ denotes the reported SNR for the f-th transmission (where f=0, 1, 2, . . . ) and $SNR_{sys}$ denotes a tracking variable for the systematic RVs. Then the algorithm comprises the following steps:
1. Send the initial transmission (i.e., f=0) of the code block. Set $SNR_{sys}=SNR_0$.
2. Wait for HARQ feedback.
3. If ACK is received, go to step 1 to process the next code block.
4. If NACK is received
   a. If $SNR_f \leq 4 \times SNR_{sys}$, send the mod(f,8)-th redundant version specified in the optimal sequence. If a systematic RV is selected, set $SNR_{sys}=SNR_f$. Go to step 2.
   b. If $SNR_f \geq 4 \times SNR_{sys}$, send the next systematic redundant version in the optimal sequence. Set $SNR_{sys}=SNR_f$. Go to step 2.

In the above, mod(f,8) means f modulo 8. For instance, mod(3,8)=3 and mod(9,8)=1.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method of communicating a message from a transmitting station to a receiving station, the method comprising the step of:
   adaptively selecting a retransmission version from a plurality of redundancy versions (RVs) based on at least one changing transmission variable, wherein adaptively selecting said retransmission version from a plurality of RVs based on at least one changing transmission variable further comprises adaptively selecting said retransmission version from a plurality of RVs defined for a Universal Mobile Telecommunications System (UMTS) High Speed Downlink Packet Access (HSDPA) transmission and wherein adaptively selecting said HSDPA retransmission version further comprises selecting said RV for a Quadrature Phase-shift Keying (QPSK) mode according to an RV sequence [0 7 3 4 1 6 5 2].

2. The method of claim 1 wherein adaptively selecting said HSDPA retransmission version in said QPSK mode further comprises selecting said RV according to an RV sequence [0 4 3 6 2 1 6 2] when the initial coding rate is lower than ½.

3. A method of communicating a message from a transmitting station to a receiving station, the method comprising the step of adaptively selecting a retransmission version from a plurality of redundancy versions (RVs) based on at least one changing transmission variable, wherein adaptively selecting said retransmission version from a plurality of RVs based on at least one changing transmission variable comprises adaptively selecting said retransmission version from a plurality of RVs defined for a Universal Mobile Telecommunications System (UMTS) High Speed Downlink Packet Access (HSDPA) transmission and wherein adaptively selecting said HSDPA retransmission version further comprises selecting said RV for a 16-ary Quadrature Amplitude Modulation (16QAM) mode according to an RV sequence [0 1 3 4 5 6 7 1].

4. The method of claim 3 wherein adaptively selecting said HSDPA retransmission version in said 16QAM mode further comprises selecting said RV according to an RV sequence [0 4 5 6 0 4 5 6] when the initial coding rate is lower than ½.

5. A method of HSDPA transmission, comprising the steps:
   performing first stage rate matching (RM) thus effectively raising the mother code rate;
   optimizing the redundancy version (RV) sequences for the specific pair of mother code rate and initial code rate;
   performing the optimization in increasing number of transmissions, wherein an optimal RV sequence for (N+1) transmissions is derived from the optimal RV sequence for N transmissions;
   further comprising providing a controlling mechanism adapted to avoid switching different RV sequences rapidly for slightly different coding rates, wherein, at the end of each optimization stage, 10 top candidates that score very closely to the optimal solution are kept as roots for the next-stage optimization; and at the end of the optimization for eight transmissions, the 10 surviving candidates are checked with the optimal solution of a nearby code rate.

6. The method of claim 5, wherein if any of the 10 survivors are identical to an optimal solution, it is selected as the optimal solution of the current code rate.

7. An apparatus adapted to facilitate the communication of a message from a transmitting station to a receiving station, the apparatus comprising:
   a means for adaptively selecting a retransmission version from a plurality of redundancy versions (RVs) based on at least one changing transmission variable, wherein the means for adaptively selecting said retransmission version from a plurality of RVs based on at least one changing transmission variable is further configured to adaptively select said retransmission version from a plurality of RVs defined for a Universal Mobile Telecommunications System (UMTS) High Speed Downlink Packet Access (HSDPA) transmission, wherein the means for adaptively selecting said HSDPA retransmission version is further configured to adaptively select said RV based on the number of retransmissions of said message, wherein the means for adaptively selecting said HSDPA retransmission version is further adapted to adaptively select said RV for a Quadrature Phase-shift Keying (QPSK) mode according to an RV sequence [0 7 3 4 1 6 5 2].

8. The apparatus of claim 7 wherein the means for adaptively selecting said HSDPA retransmission version in said QPSK mode is further adapted to adaptively select said RV according to an RV sequence [0 4 3 6 2 1 6 2] when the initial coding rate is lower than ½.

9. An apparatus adapted to facilitate the communication of a message from a transmitting station to a receiving station, the apparatus comprising a means for adaptively selecting a retransmission version from a plurality of redundancy versions (RVs) based on at least one changing transmission variable, wherein the means for adaptively selecting said retransmission version from a plurality of RVs based on at least one changing transmission variable is further adapted to adaptively select said retransmission version from a plurality of RVs defined for a Universal Mobile Telecommunications System (UMTS) High Speed Downlink Packet Access (HSDPA) transmission, and wherein the means for adaptively selecting said HSDPA retransmission version is further adapted to adaptively select said RV for a 16-ary Quadrature Amplitude Modulation (16QAM) mode according to an RV sequence [0 1 3 4 5 6 7 1].

10. The apparatus of claim 9 wherein the means for adaptively selecting said HSDPA retransmission version in said 16QAM mode is further adapted to adaptively select said RV according to an RV sequence [0 4 5 6 0 4 5 6] when the initial coding rate is lower than ½.

* * * * *